Aug. 28, 1928.

A. C. PARODI 1,682,683

TOASTER AND BROILER

Filed June 27, 1925

INVENTOR
*Angelo Cesare Parodi,*
BY 
ATTORNEYS

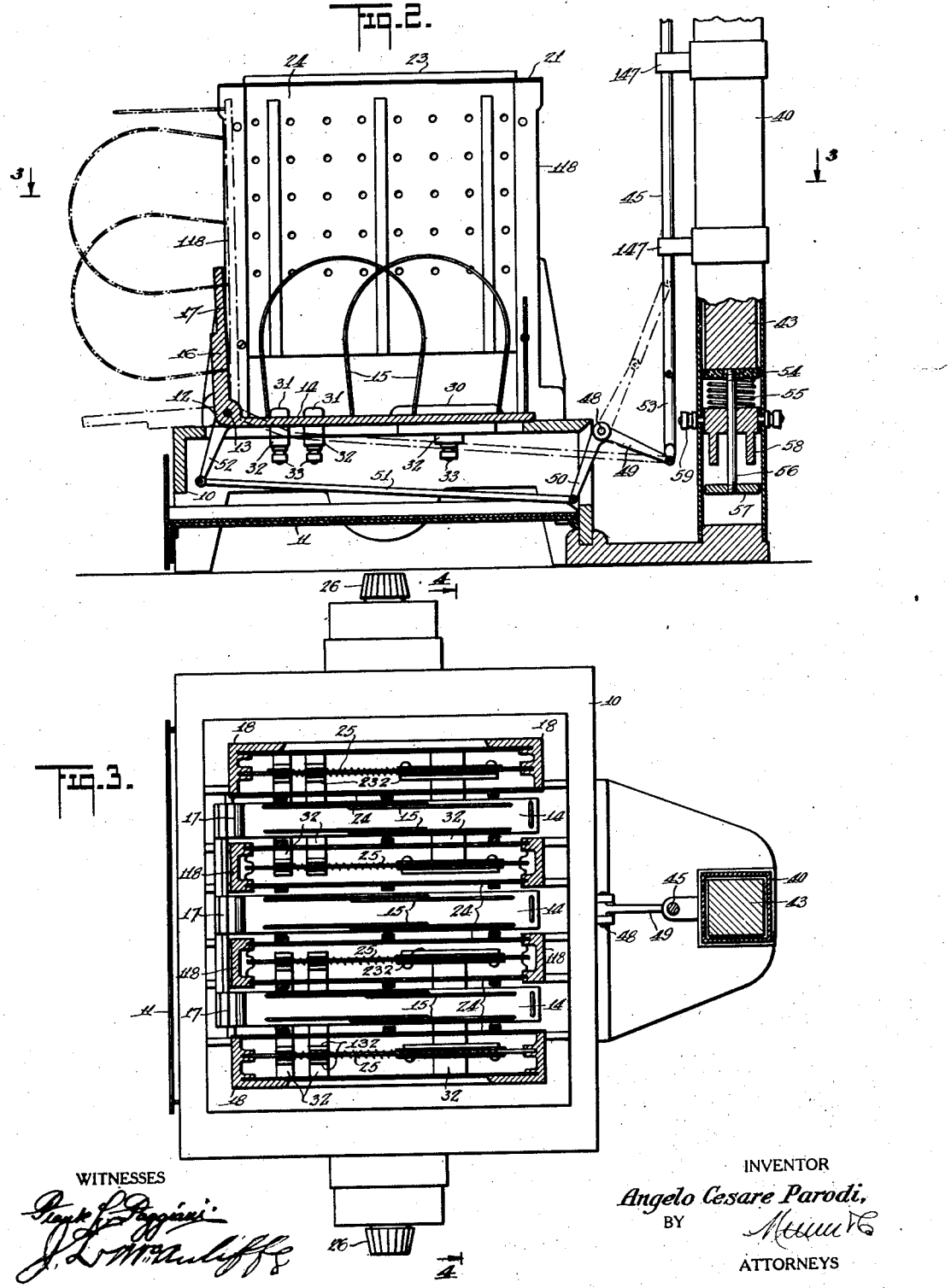

Aug. 28, 1928.

A. C. PARODI 1,682,683

TOASTER AND BROILER

Filed June 27, 1925

WITNESSES

INVENTOR
Angelo Cesare Parodi,
BY
ATTORNEYS

Aug. 28, 1928.
A. C. PARODI
1,682,683
TOASTER AND BROILER
Filed June 27, 1925 4 Sheets-Sheet 4
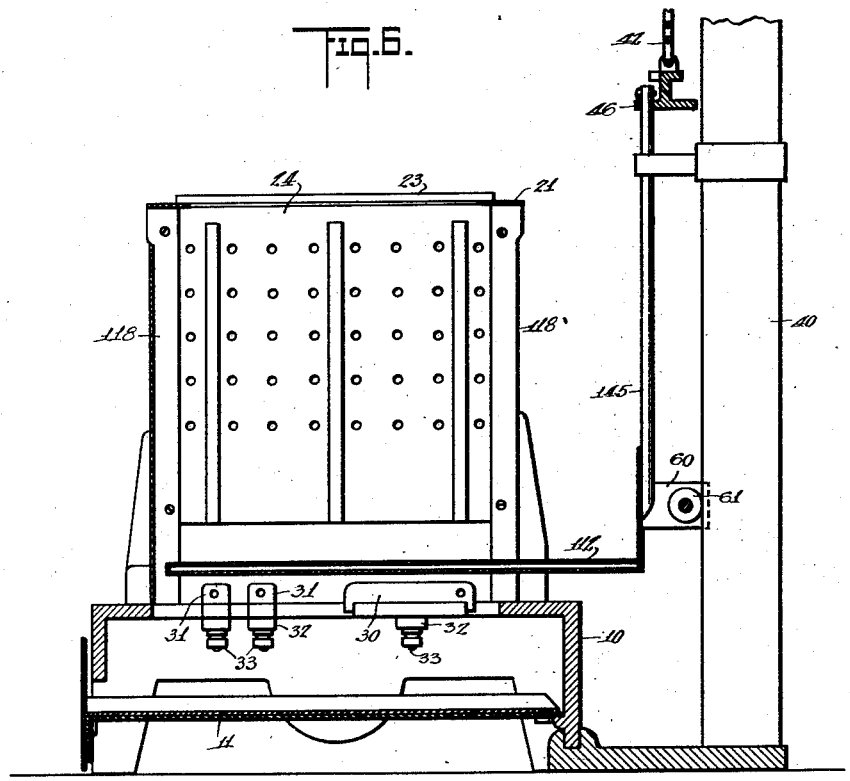
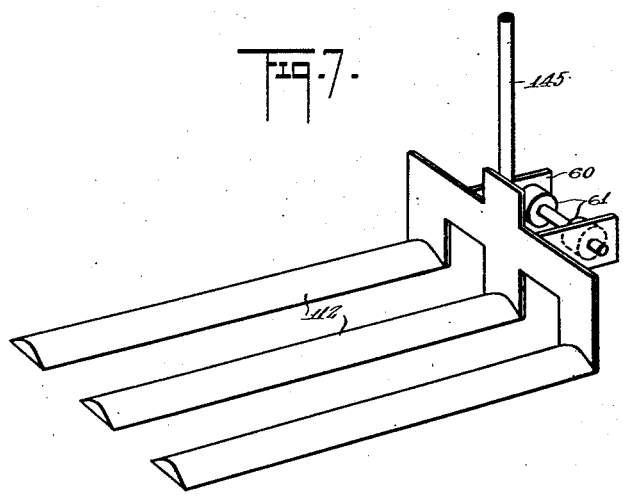
WITNESSES
INVENTOR
Angelo Cesare Parodi,
BY
ATTORNEYS Patented Aug. 28, 1928.

1,682,683

UNITED STATES PATENT OFFICE.

ANGELO C. PARODI, OF JERSEY CITY HEIGHTS, NEW JERSEY.

TOASTER AND BROILER.

Application filed June 27, 1925. Serial No. 40,028.

My invention relates to a toaster or broiler and particularly is intended for embodiment in a device in which the toasted bread or broiled meat is displaced from the heating position mechanically after the lapse of a given period of time for which the controlling means is set.

The general object of my invention is to provide an automatic toaster and broiler having novel means for causing the toasted bread or broiled meat to be moved away from the region of the heating means, as well as to provide for the automatic and effective operation of the device to positively throw out the bread or meat mechanically after the lapse of a predetermined time for which the device is set.

A further object of the invention is to provide a toaster or broiler having rockable bread or meat-holding devices and means to give the rocking movement to the said devices to throw out the bread or meat upon completion of the toasting or broiling process.

The invention also has for its purpose to so arrange a toaster and broiler equipped with a rockable bread or meat holder that the said rockable bread or meat holding means may be conveniently removed and a liftable holder be substituted when that is desired.

The manner and means whereby the above and other objects are attained will clearly appear as the description proceeds.

Reference is to be had to the accompanying drawings forming a part of this specification, it being understood that the drawings are merely illustrative of one example of the invention.

Figure 2 is a vertical section in a plane indicated by the line 2—2, Figure 1;

Figure 3 is a horizontal section on the line 3—3, Figure 2;

Figure 6 is a view similar to Figure 2 but showing a liftable holder substituted for the rockable holding means of Figure 2;

Figure 7 is a perspective view of the liftable holder shown in Figure 6.

Figure 1:
Figure 1 is a perspective view of a toaster and broiler embodying my invention.

In carrying out my invention in practice, a base 10 is provided in which is fitted a slidable pan 11 to receive the toasted bread or broiled meat discharged from the toaster or broiler. Holders designated generally by the numeral 12 and adapted to hold meat or bread to be broiled or toasted, are pivoted, as at 13, to swing vertically relatively to the base 10. The holders include a bottom plate 14 on which vertically disposed cuts of bread or slices of meat may rest, and wire guards 15 rising from each plate 14 at the sides thereof, as well as a front 16 having upwardly extending members 17 serving to retain the bread cuts, or slices of meat, said front 16 being hereinafter referred to.

Vertical heater chambers 18 are provided on the base at the sides thereof as well as intermediate heater chambers 118, here shown as having forward foot extensions 19 secured by screws 20 to base 10. A cover plate 21 is provided common to all the heater chambers 18 and 118 and removably fastened by any suitable means such as screws 22.

Figure 5:
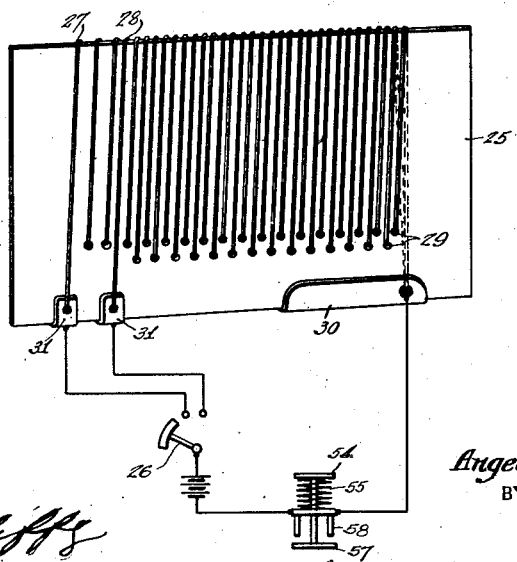
Figure 5 is a perspective view of one of the heating units.

The numeral 23 indicates strengthening ribs on the cover plate 21. The side walls 24 of the several heater chambers 18, 118 are perforated and in practice are made of mica. Within each heater chamber is a heating unit 25. A circuit that may be employed for each heater unit is shown in Figure 5 and controlled by a switch of any approved form designated 26. The heater unit 25 includes an insulator plate and in order that the heat may be varied, I provide two coils 27, 28 the wires of which are passed through two series of holes 29 one above the other in the insulator plate 25. Terminal connections 30, 31 are provided for the circuit wires and these are adapted to make contact with terminals 32 having binding post 33, see Figures 2 and 6. Means is provided as hereinafter described for automatically breaking the circuit to cut off the heat in the element 25 at a predetermined time. It will be noted particularly from Figure 5 that the holes 29 through which the coils pass in each heater element are remote from the terminal connections 30, 31, provided on the plate 25; the arrangement is for the purpose of preventing possible short-circuiting by contact of the wires 27, 28 with the terminal connections 30, 31. The toaster or broiler is provided with means to tilt the holders 12 for discharging the toasted bread or broiled meat from the same onto the pan 11 or other receptacle.

I would here state that in practice I utilize in the present example a mechanism known in automatic egg boilers for lifting the egg basket out of boiling water. Such an egg boiler as referred to is shown in Patent No. 1,500,958 granted to me July 8, 1924. The devices shown in said patent include a tubular standard 40, a clockwork box 41 and a lift chain 42 which in practice is actuated by the dropping of a weight 43 (see Figures 2 and 3). As is well known to those acquainted with automatic egg boilers, the dropping of the weight such as 43 is controlled by the clockwork mechanism according to the position of a setting slide 44. The operation for giving lifting action on a chain 42 being well known, no further description is required here.

In the present invention I provide a rod 45 connected to the chain 42 by a suitable connecting fitting 46. The numerals 47 and 147 indicate guides for rod 45, said guides fixed on the front of standard 40. Connection between the rod 45 and the tiltable holders 12 is effected in the illustrated example as follows: A transverse shaft 48 is mounted on the base 10 at the rear and said shaft is provided with bellcrank levers 49. One arm 50 of each bellcrank lever is connected by a link 51 with a crank arm 52 on the adjacent holder 12 so that a movement of the arm 50 in one direction will, through link 51 and arm 52, rock the holder about the pivot 13 as an axis and throw the bread or meat holder from the full line position of Figure 2 to the dotted line position shown in said figure whereby the bread or meat will drop from the holder to the pan 11 or other receptacle. The other arm of the bellcrank lever 49 connects by a link 53 with the lower end of lift rod 45. In the standard 40 is an automatic circuit breaker controlled by the weight 43. In the illustrated form an insulating head 54 is disposed and yieldingly sustained by a spring 55. The head 54 is on a stem 56 carrying a movable contact 57 adapted to engage fixed contacts 58 adjustably held by set screws 59 in the standard 40.

With the described arrangement when the clockwork referred to permits the weight 43 to fall and rest on the insulating head 54, said head moves downwardly against the spring 55 and carries the contact 57 out of engagement with the fixed contacts 58, thereby breaking the circuit in which the heater coil wires 27, 28 are included, thereby cutting off the heat. Simultaneously with the cutting off of the heat the rising of the chain lifts the rod 45 and through link 53, bellcrank 49, shaft 48, rod 51, and arm 52 rocks the several holders 12 to a position to discharge the toasted or broiled cuts.

In the form shown in Figures 6 and 7 the parts are the same as described except that the holder 112 is adapted to have a straight up and down movement between the heater chambers 18. In this instance, there is secured to the holder 112 a rod 145 secured to the fitting 46 and provided with a bracket 60 having anti-friction rollers 61 bearing against the front face of standard 40. Thus, with the lifting movement of the chain 42, the rod 145 will be raised and directly lift the several holders 112 to the top of the heater chambers 18.

Figure 4:
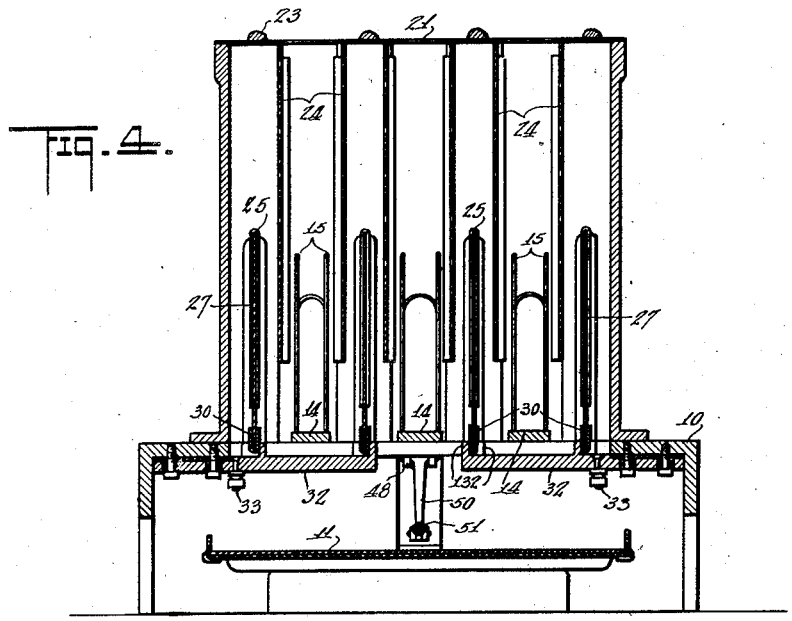
Figure 4 is a vertical section at right angles to Figure 2 as indicated by the line 4—4 in Figure 3.

Referring to the terminals 32, it will be observed from Figure 4 that they extend laterally inward and receive a plurality of the elements 30, said elements 30 being held by lugs 132, 232 on said terminals. The arrangement is such that the heating elements may be disengaged from the holding members 132, 232 and removed through the top of the heating chambers 18, 118 when the cover 21 is taken off.

Reverting to the front 16 of the holders 12, it will be observed that in one position, said front 16 is disposed horizontally to permit ready escape of the toasted bread or broiled meat. The numeral 62 indicates a holding device for rod 45, said device 62 having a slot and pin connection with the standard 40 and presenting a slot 63 adapted to partially accommodate the rod 45 for permitting said device 62 to be moved to a position above a collar 64 on rod 45 to prevent upward movement of said rod and thereby prevent the movement of the holders 12.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. In a device of the class described, an electric heating means, a holder adapted to receive bread or meat, said holder pivoted to move in a vertical plane from a position alongside the heating means to a position away from the heating means and adapted to permit a discharge of the material treated, operating means for said holder, automatic actuating means for the said operating means, an electric circuit in which the heating means is included, a circuit breaker, said operating means for the holder adapted to move under its own weight in a substantially vertical path, the said circuit breaker being disposed in the path of movement of said operating means to be directly engaged thereby for breaking the circuit by engagement of the operating means therewith.

2. A device of the class described including holders adapted to receive material to be subjected to heat, a vertically reciprocating operating rod operatively connected with said holders, and a weight having guided vertical movement and having a connection with said rod to actuate the same, together with means to raise said weight, said weight being adapted to descend gravitationally.

3. In a device of the class described employing holders for the material to be subjected to heat, a weight adapted to move said holders away from the source of heat, and a circuit breaker operated by said weight, said circuit breaker including fixed contacts in the vertical plane of the weight, a stem adapted to be depressed by the weight, and a movable contact carried by said stem and adapted to engage and disengage the fixed contacts, said weight adapted to descend gravitationally, together with means to control the descent of said weight.

ANGELO C. PARODI.